US007564598B2

(12) United States Patent
Lin

(10) Patent No.: US 7,564,598 B2
(45) Date of Patent: Jul. 21, 2009

(54) HINGE ASSEMBLY CAPABLE OF RETAINING A CABLE

(75) Inventor: Chia-Shin Lin, Hsinchu (TW)

(73) Assignee: Avision Inc. (TW)

( * ) Notice: Subject to any disclaimer, the term of this patent is extended or adjusted under 35 U.S.C. 154(b) by 973 days.

(21) Appl. No.: 11/060,761

(22) Filed: Feb. 18, 2005

(65) Prior Publication Data

US 2005/0183241 A1 Aug. 25, 2005

(30) Foreign Application Priority Data

Feb. 25, 2004 (TW) .............................. 93104713 A

(51) Int. Cl.
*H04N 1/04* (2006.01)

(52) U.S. Cl. ....................... 358/474; 358/498; 399/367; 399/379; 16/337; 16/342

(58) Field of Classification Search ................. 358/398, 358/474; 399/367, 379, 378, 389; 16/337, 16/342, 338
See application file for complete search history.

(56) References Cited

U.S. PATENT DOCUMENTS

| | | | | | |
|---|---|---|---|---|---|
| 5,088,156 | A | * | 2/1992 | Hosoi | 16/342 |
| 5,572,769 | A | * | 11/1996 | Spechts et al. | 16/337 |
| 6,167,232 | A | * | 12/2000 | Jimenez et al. | 399/367 |
| 2003/0117670 | A1 | * | 6/2003 | Brugger et al. | 358/474 |

FOREIGN PATENT DOCUMENTS

| | | | |
|---|---|---|---|
| JP | 08-114215 | A | 7/1996 |

* cited by examiner

*Primary Examiner*—Negussie Worku

(57) ABSTRACT

A hinge assembly capable of retaining a cable includes a hollow hub disposed on a first body, a bracket holder disposed on a second body, and an integrating member rotatably disposed on the hollow hub for integrating the hollow hub to the bracket holder and having a through hole and an external mounting part. The hollow hub inserts into the through hole. The external mounting part formed around an outer circumference of the through hole mounts the hollow hub on the bracket holder and abuts on the bracket holder. The integrating member is rotated to fix the hollow hub firmly to the bracket holder. The cable for electrically connecting the first body to the second body passes through the hollow hub.

16 Claims, 6 Drawing Sheets

HINGE ASSEMBLY CAPABLE OF RETAINING A CABLE

BACKGROUND OF THE INVENTION

1. Field of the Invention

The invention relates to a hinge assembly, and more particularly to a hinge assembly capable of retaining a cable and being easily assembled.

2. Description of the Related Art

The conventional hinge connects two members that are rotatable relative to each other, and the cables connecting or passing through the two members are usually directly disposed between the two members. Such a disposition deforms the appearance, and the exposed cables tend to be peeled off and cause the short-circuit phenomenon. Furthermore, when the two members are rotated relative to each other, the cables tend to be tom. In addition, managing the cables spends a lot of time, and elements for binding the cables also have to be used.

U.S. Pat. No. 5,572,769 discloses a tunable hinge assembly capable of retaining cables, wherein a clamping part and a screw are provided to fix the hollow hub. However, in this hinge structure, two openings of the clamping part have to be aligned with each other, and then the clamping part and the hub are fixed using a screw and a nut. This assembling method is too complicated and cannot meet the requirement of mass production.

U.S. Pat. No. 5,088,156 discloses a hinge assembly capable of retaining cables. The hinge assembly has a helical spring disposed in the hollow shaft, and the cable passes through the helical spring. This kind of hinge assembly has a drawback that the cables have to pass through the helical spring directly in the axial direction. When a cable has two large connectors at both ends, the assembler has to cut the cable so that the cable can pass through the helical spring. Alternatively, the assembler has to penetrate the cable through the helical spring and then connects the connector to the cable. Thus, the number of parts of the hinge assembly in the '156 patent is great, and the hinge assembly cannot be easily assembled.

Therefore, it is an important object of the invention to provide a hinge assembly capable of retaining a cable and being easily assembled.

SUMMARY OF THE INVENTION

It is therefore an object of the invention to provide a hinge assembly capable of retaining a cable and being easily assembled, wherein an integrating member is utilized to speed up the assembling process and enhance the assembling convenience.

To achieve the above-mentioned object, the invention provides a hinge assembly capable of retaining a cable. The hinge assembly includes a hollow hub disposed on a first body, a bracket holder disposed on a second body, and an integrating member having a through hole and an external mounting part. The hollow hub inserts into the through hole, and the integrating member is rotatable relative to the hollow hub. The external mounting part formed around an outer circumference of the through hole upholds the integrating member on the bracket holder. The cable for electrically connecting the first body to the second body passes through the hollow hub.

Thus, the cable may be protected and retained and the overall hinge assembly is easily to be assembled and disassembled.

DETAILED DESCRIPTION OF THE INVENTION

Figure 1:
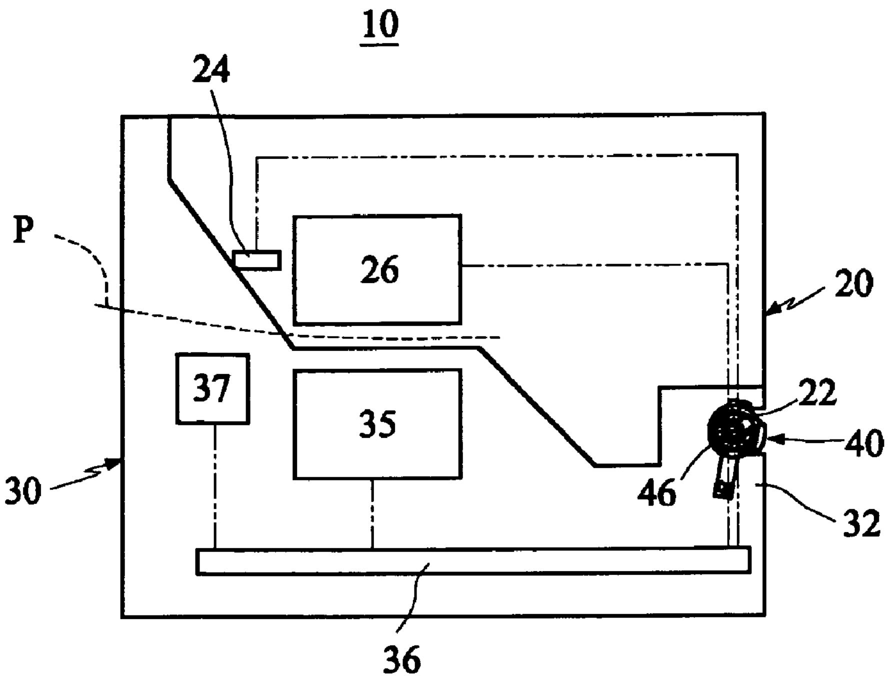
FIG. 1 is a schematic illustration showing a closed state of a sheet-fed scanner equipped with a hinge assembly of the invention.
Figure 2:
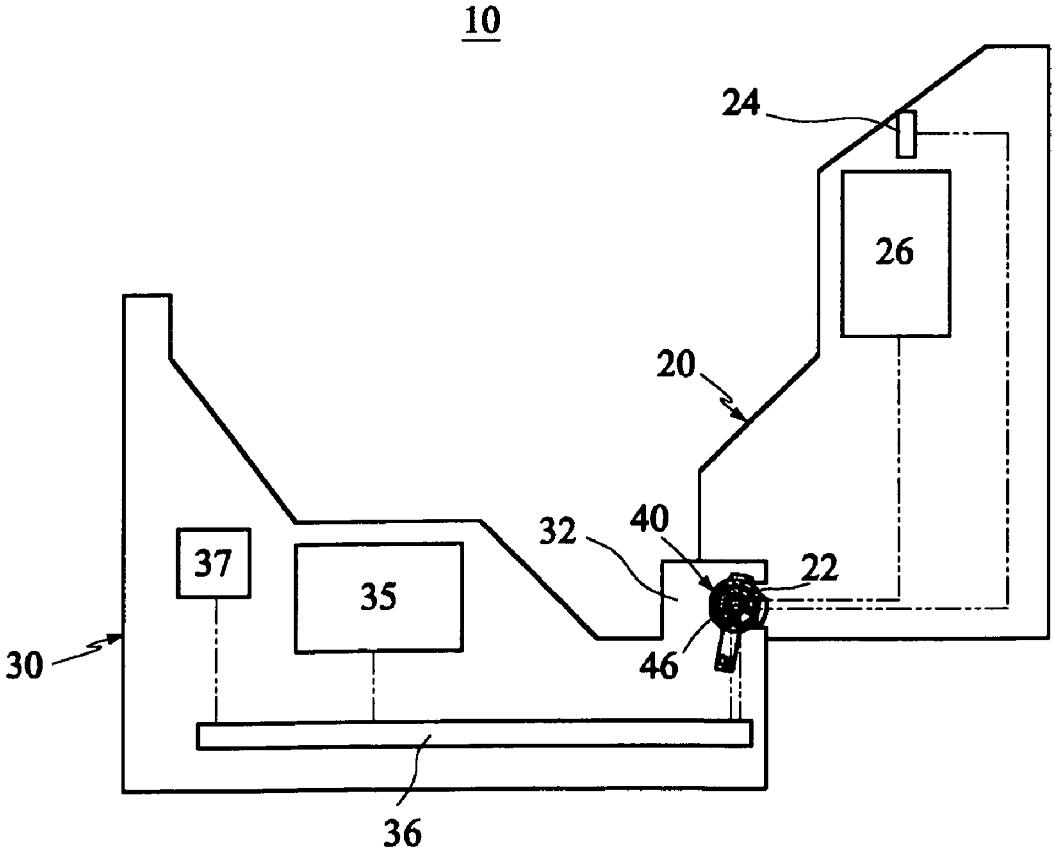
FIG. 2 is a schematic illustration showing an opened state of the sheet-fed scanner equipped with the hinge assembly of the invention.

FIGS. 1 and 2 are schematic illustrations respectively showing a closed state and an opened state of a sheet-fed scanner equipped with a hinge assembly of the invention. Referring to FIGS. 1 and 2, a hinge assembly 10 of the invention capable of retaining a cable 46 includes a hollow hub 22, a bracket holder 32 and an integrating member 40. The hollow hub 22 is disposed on a first body 20. The bracket holder 32 is disposed on a second body 30. The integrating member 40 is for fixing the hollow hub 22 to the bracket holder 32, and is rotatable relative to the hollow hub 22. Thus, the integrating member 40 is rotatably disposed on the hollow hub 22 and is for integrating the hollow hub 22 to the bracket holder 32. The cable 46, which may be constituted by one or multiple electrical connection lines, passes through the hollow hub 22 and electrically connects one of multiple electrical devices of the first body 20 to one of multiple electrical devices of the second body 30.

In this embodiment, the first body 20 and the second body 30 constitute a sheet-fed scanner. Thus, the second body 30 is provided with a sheet-feeding mechanism 37 for feeding a document P, a first optical scanning module 35 for scanning a front side of the document P, and a main circuit board 36 electrically connected to the sheet-feeding mechanism 37 and the first optical scanning module 35. The first body 20 is provided with a sheet detector 24, which is electrically connected to the main circuit board 36 through the cable 46. On the other hand, the first body 20 is further provided with a second optical scanning module 26 for scanning a back side of the document P. The second optical scanning module 26 also may be electrically connected to the main circuit board 36 through the cable 46. Thus, the sheet-fed scanner can perform a duplex scan process.

Figure 3:
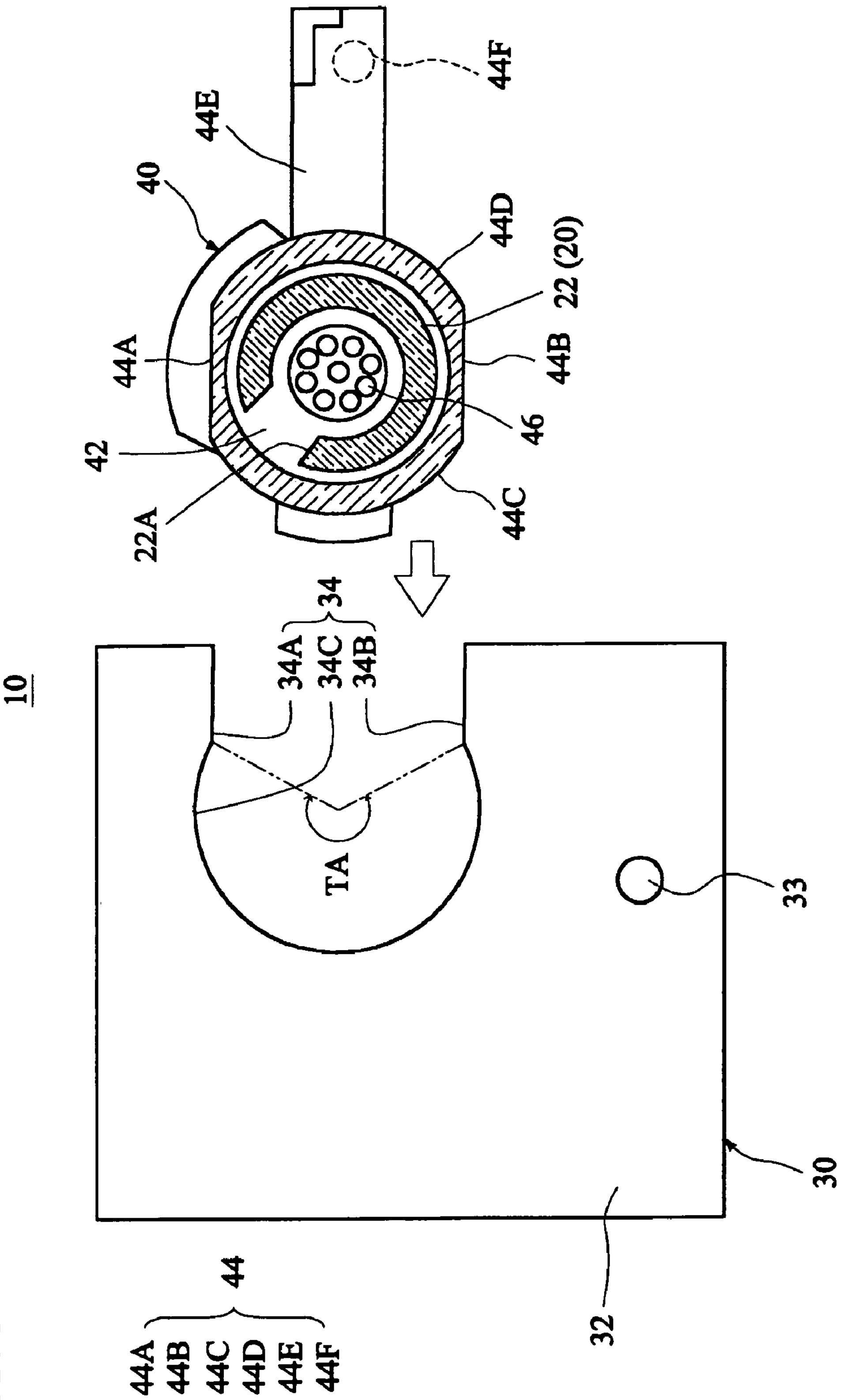
FIG. 3 is a plane view showing an exploded state of the hinge assembly of the invention.
Figure 4:
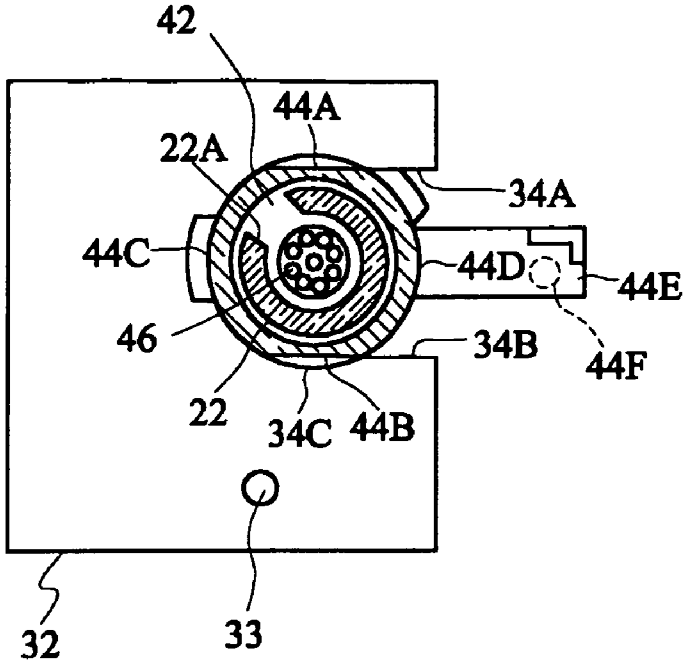
FIG. 4 shows a first assembled state of the hinge assembly of FIG. 3.
Figure 5:
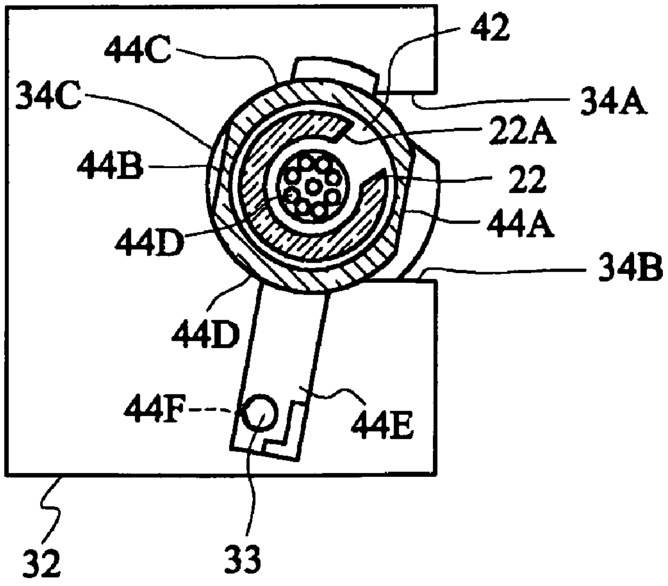
FIG. 5 shows a second assembled state of the hinge assembly of FIG. 3.

FIG. 3 is a plane view showing an exploded state of the hinge assembly of the invention. FIGS. 4 and 5 show first and second assembled states of the hinge assembly of FIG. 3. As shown in FIGS. 3 to 5, the integrating member 40 has a through hole 42 and an external mounting part 44. The hollow hub 22 inserts into the through hole 42 and the integrating member 40 mounts on the bracket holder 32 with the external mounting part 44, formed around an outer circumference of the through hole 42, pressing against the bracket holder 32.

That is, the external mounting part 44 is for mounting the hollow hub 22 on the bracket holder 32 and abutting on the bracket holder 32. The bracket holder 32 is formed with a C-shaped opening 34. The C-shaped opening 34 includes a first internal plane 34A, a second internal plane 34B facing the first internal plane 34A, and an internal camber 34C connecting the first internal plane 34A to the second internal plane 34B. In order to make the integrating member 40 be rotated clockwise into the state of FIG. 5 after being placed into the C-shaped opening 34 (FIG. 4) in the arrow direction of FIG. 3, an arc angle TA of the internal camber 34C has to be greater than 180 degrees.

The external mounting part 44 of the integrating member 40 includes a first external plane 44A and a second external plane 44B on opposite sides of the external mounting part 44, and a first external camber 44C and a second external camber 44D on opposite sides of the external mounting part 44. The external cambers 44C and 44D connect the first external plane 44A to the second external plane 44B, respectively. Therefore, the integrating member 40 is placed onto the bracket holder 32 with the first external plane 44A and the second external plane 44B of the external mounting part 44 parallel to the first internal plane 34A and the second internal plane 34B of the integrating member 40 and with the first external camber 44C in contact with the internal camber 34C.

In order to enable the integrating member 40 to fix the hollow hub 22 to the bracket holder 32, the integrating member 40 of the invention is configured such that the integrating member 40 is rotated by a predetermined angle, after the integrating member 40 is placed onto the bracket holder 32. That is, the integrating member 40 is rotated to fix the hollow hub 22 firmly to the bracket holder 32. In order to achieve such a function, the external mounting part 44 of the integrating member 40 further includes an elastic arm 44E and a first engagement structure 44F. The elastic arm 44E extends from the second external camber 44D in a radial direction. The first engagement structure (projection) 44F is formed on the elastic arm 44E so as to engage with a second engagement structure (hole) 33 of the bracket holder 32 after the integrating member 40 is rotated by the predetermined angle. In the actual assembling process, when the projection 44F is rotated such that it is blocked by the bracket holder 32, the projection 44F can be slightly lifted up with respect to the plane of FIG. 5 and then be rotated until the projection 44F falls into the hole 33. In the disassembling process, the projection 44F can be slightly lifted up with respect to the plane of FIG. 5, and then the elastic arm 44E can be rotated counterclockwise to complete the subsequent disassembling process.

In order to make the cable 46 be conveniently inserted into the hollow hub 22, the hollow hub 22 can have an axial opening 22A, through which the cable 46 can be placed into the hollow hub 22.

Figure 6:
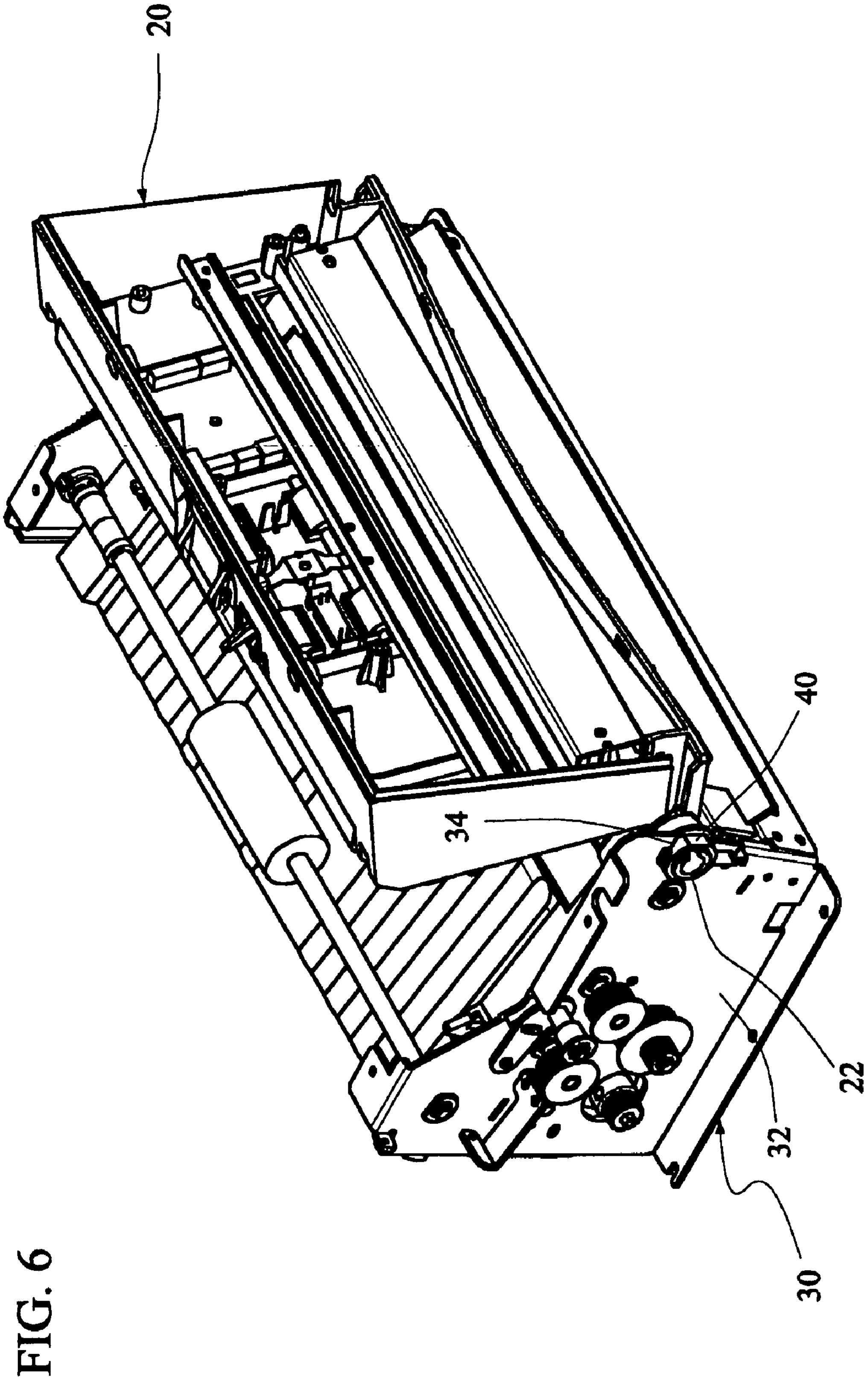
FIG. 6 is a pictorial view showing the opened state of the sheet-fed scanner equipped with the hinge assembly of the invention.
Figure 7:
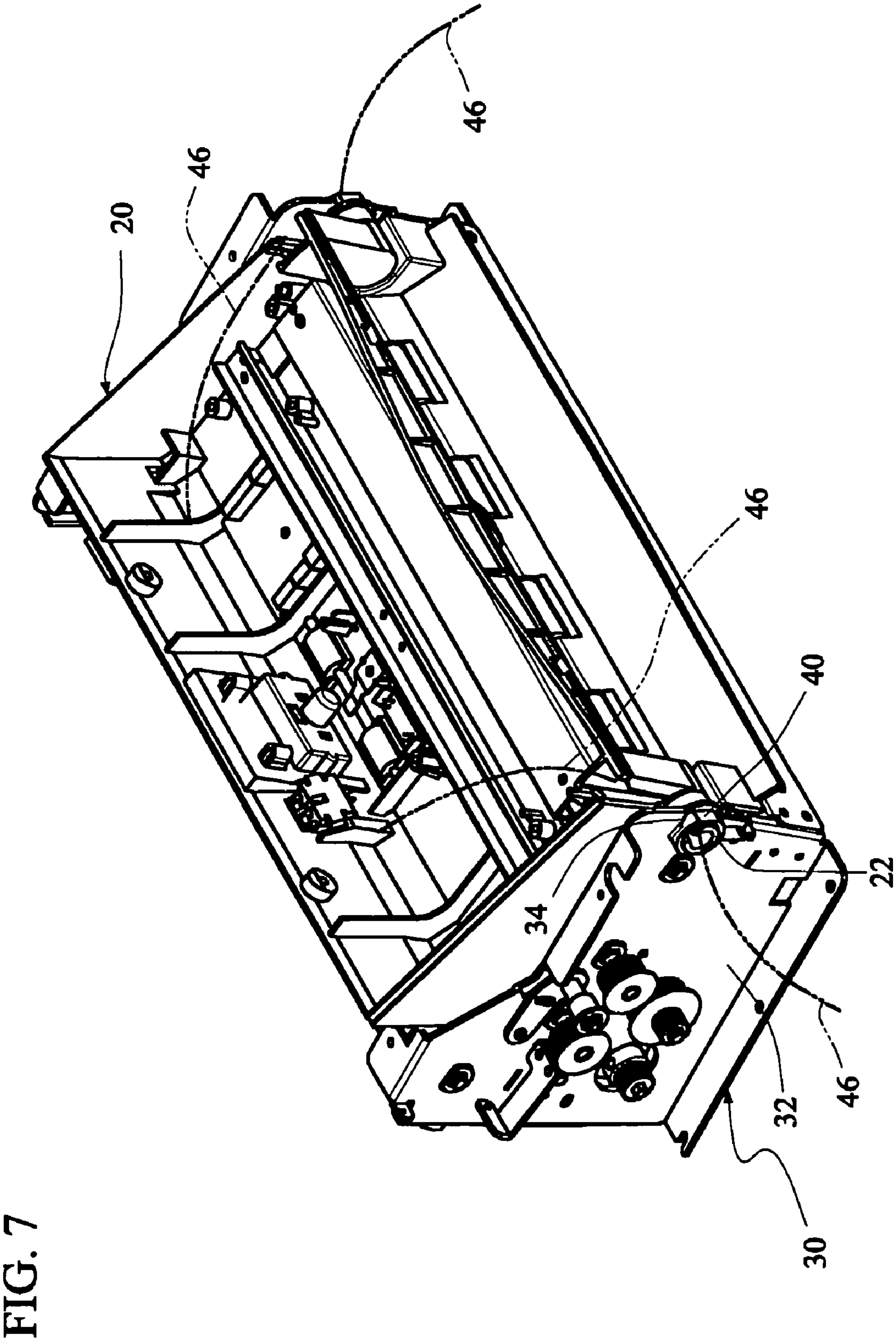
FIG. 7 is a pictorial view showing the closed state of the sheet-fed scanner equipped with the hinge assembly of the invention.
Figure 8:
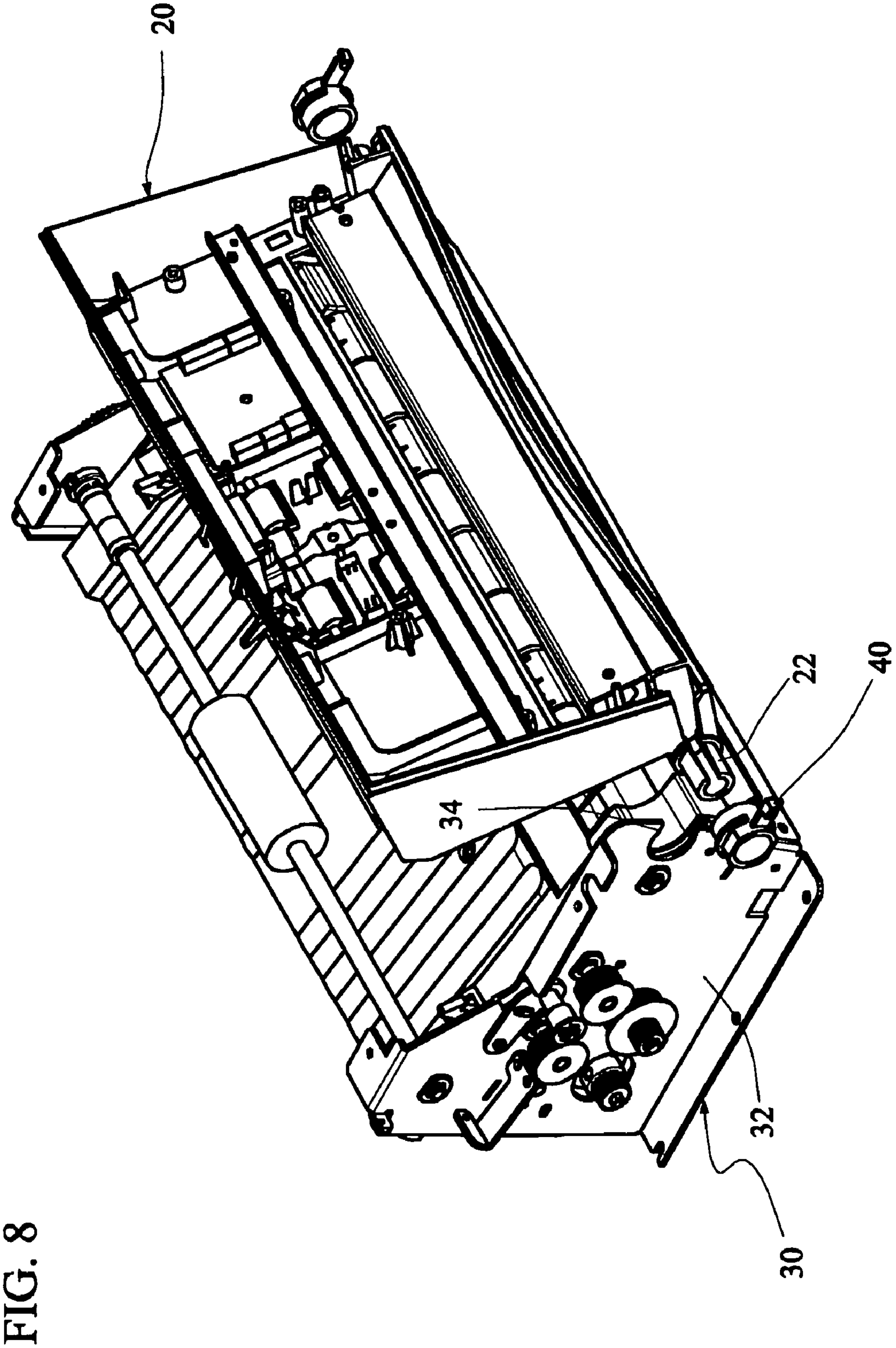
FIG. 8 is a pictorial view showing an exploded state of the sheet-fed scanner equipped with the hinge assembly of the invention.

FIGS. 6 to 8 are pictorial views showing the sheet-fed scanner equipped with the hinge assembly of the invention. In practice, the sheet-fed scanner adopts two hinge assemblies. However, only one hinge assembly can be used in order to reduce the cost. The sheet-fed scanner of FIG. 6 is in the opened state, the sheet-fed scanner of FIG. 7 is in the closed state, and the hinge assembly of FIG. 8 is in the exploded state.

According to the hinge assembly of the invention capable of retaining a cable, it is possible to utilize one integrating member to speed up and facilitate the assembling process, and it is also possible to integrate the hinges and the cable managing structures of two members so as to achieve the advantages of space saving, part saving, appearance glorifying, and preventing the cable from being damaged. In addition, the outer diameter of the hollow hub of the hinge may be enlarged in order to enhance the intensity of the hinge and lengthen the lifetime of the hinge.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A hinge assembly capable of retaining a cable, comprising:

a hollow hub disposed on a first body;

a bracket holder disposed on a second body; and an integrating member, rotatably disposed on the hollow hub, for integrating the hollow hub to the bracket holder, the integrating member comprising:

a through hole, wherein the hollow hub inserts into the through hole; and an external mounting part, formed around an outer circumference of the through hole, for mounting the hollow hub on the bracket holder and abutting on the bracket holder;

wherein the integrating member is rotated to fix the hollow hub firmly to the bracket holder; and the cable passes through the hollow hub and electrically connects the first body to the second body.

2. The hinge assembly according to claim 1, wherein the bracket holder is formed with a C-shaped opening, comprising a first internal plane, a second internal plane facing the first internal plane, and an internal camber connecting the first internal plane to the second internal plane.

3. The hinge assembly according to claim 2, wherein the external mounting part of the integrating member comprises:

a first external plane and a second external plane on opposite sides of the external mounting part; and a first external camber and a second external camber on opposite sides of the external mounting part;

wherein each of the first and second external cambers connects the first external plane to the second external plane such that the integrating member is placed onto the bracket holder with the first external plane and the second external plane of the external mounting part parallel to the first internal plane and the second internal plane of the bracket holder and with the first external camber in contact with the internal camber.

4. The hinge assembly according to claim 3, wherein the integrating member is rotated by a predetermined angle, after the integrating member is placed onto the bracket holder, to secure the integrating member on the bracket holder.

5. The hinge assembly according to claim 4, wherein the external mounting part of the integrating member further comprises:

an elastic arm extending from the second external camber along a radial direction; and a first engagement structure formed on the elastic arm such that the first engagement structure is engaged with a second engagement structure of the bracket holder after the integrating member is rotated by the predetermined angle.

6. The hinge assembly according to claim 1, wherein the first body and the second body constitute a sheet-fed scanner.

7. The hinge assembly according to claim 1, wherein:

the second body is provided with:

a sheet-feeding mechanism for feeding a document;

a first optical scanning module for scanning a front side of the document; and a main circuit board electrically connected to the sheet-feeding mechanism and the first optical scanning module; and the first body is provided with a sheet detector, which is electrically connected to the main circuit board through the cable.

8. The hinge assembly according to claim 7, wherein the first body is further provided with a second optical scanning module for scanning a back side of the document, and the second optical scanning module is electrically connected to the main circuit board through the cable.

9. The hinge assembly according to claim 1, wherein the hollow hub has an axial opening though which the cable is placed into the hollow hub.

10. The hinge assembly according to claim 9, wherein the bracket holder is formed with a C-shaped opening, comprising a first internal plane, a second internal plane facing the first internal plane, and an internal camber connecting the first internal plane to the second internal plane.

11. The hinge assembly according to claim 10, wherein the external mounting part of the integrating member comprises:

a first external plane and a second external plane on opposite sides of the external mounting part; and a first external camber and a second external camber on opposite sides of the external mounting part;

wherein each of the first and second external cambers connects the first external plane to the second external plane such that the integrating member is placed onto the bracket holder with the first external plane and the second external plane of the external mounting part parallel to the first internal plane and the second internal plane of the bracket holder and with the first external camber in contact with the internal camber.

12. The hinge assembly according to claim 11, wherein the integrating member is rotated by a predetermined angle, after the integrating member is placed onto the bracket holder, to secure the integrating member on the bracket holder.

13. The hinge assembly according to claim 12, wherein the external mounting part of the integrating member further comprises:

an elastic arm extending from the second external camber along a radial direction; and a first engagement structure formed on the elastic arm such that the first engagement structure is engaged with a second engagement structure of the bracket holder after the integrating member is rotated by the predetermined angle.

14. The hinge assembly according to claim 9, wherein the first body and the second body constitute a sheet-fed scanner.

15. The hinge assembly according to claim 9, wherein:

the second body is provided with:

a sheet-feeding mechanism for feeding a document;

a first optical scanning module for scanning a front side of the document; and a main circuit board electrically connected to the sheet-feeding mechanism and the first optical scanning module; and the first body is provided with a sheet detector, which is electrically connected to the main circuit board though the cable.

16. The hinge assembly according to claim 15, wherein the first body is further provided with a second optical scanning module for scanning a back side of the document, and the second optical scanning module is electrically connected to the main circuit board through the cable.

* * * * *